(12) United States Patent
Kim et al.

(10) Patent No.: US 6,522,377 B2
(45) Date of Patent: Feb. 18, 2003

(54) TRANSFLECTIVE COLOR LCD HAVING DUMMY PATTERNS ON COLOR FILTER AND METHOD OF MANUFACTURING THE SAME

(75) Inventors: Woong-Kwon Kim, Kunpo-shi (KR); Sang-Hee Yu, Seoul (KR)

(73) Assignee: LG. Philips LCD Co., Ltd., Seoul (KR)

( * ) Notice: Subject to any disclaimer, the term of this patent is extended or adjusted under 35 U.S.C. 154(b) by 68 days.

(21) Appl. No.: 09/894,137

(22) Filed: Jun. 29, 2001

(65) Prior Publication Data

US 2002/0054256 A1 May 9, 2002

(30) Foreign Application Priority Data

Oct. 27, 2000 (KR) .................................. P2000-63567

(51) Int. Cl.⁷ ........................ G02F 1/1335; G02F 1/13
(52) U.S. Cl. ...................... 349/114; 349/106; 349/113; 349/187
(58) Field of Search ................... 349/106, 108, 349/107, 113, 114, 63, 117, 110, 187

(56) References Cited

U.S. PATENT DOCUMENTS 5,396,356 A * 3/1995 Fukuchi ..................... 349/153
6,111,624 A * 8/2000 Matsuoka et al. ........... 349/106

FOREIGN PATENT DOCUMENTS

JP 04-020927 A * 1/1992
JP 04-307518 A * 10/1992

* cited by examiner

Primary Examiner—Tarifur R. Chowdhury
(74) Attorney, Agent, or Firm—McKenna Long & Aldridge LLP

(57) ABSTRACT

A transflective liquid crystal display device includes: an upper substrate and a lower substrate opposing each other; a lower transparent electrode formed on the lower substrate; a passivation layer formed on the lower transparent electrode; a reflective electrode formed on the passivation layer, the reflective electrode having an open hole formed passing through the passivation layer such that a portion of the lower transparent electrode is exposed; a liquid crystal layer interposed between the upper and lower substrates, the liquid crystal layer having a first cell gap that corresponds to the lower transparent electrode and a second cell gap that corresponds to the reflective electrode, wherein the first cell gap is larger than the second cell gap; a color filter layer formed on the upper substrate, the color filter layer including a first portion that corresponds to the reflective electrode, a second portion that corresponds to the open hole, and a dummy pattern, wherein the second portion is thicker than the first portion, and the dummy pattern is formed in the second portion; and an upper transparent electrode formed on the color filter layer.

10 Claims, 5 Drawing Sheets

TRANSFLECTIVE COLOR LCD HAVING DUMMY PATTERNS ON COLOR FILTER AND METHOD OF MANUFACTURING THE SAME

This application claims the benefit of Korean Patent Application No. 2000-63567 filed on Oct. 27, 2000, which is hereby incorporated by reference for all purposes as if fully set forth herein.

BACKGROUND OF THE INVENTION

1. Field of the Invention

The present invention relates to a liquid crystal display device, and more particularly to a transflective liquid crystal display (LCD) device implementing a color filter having varying thickness.

2. Discussion of the Related Art

As an information-oriented society rapidly develops, display devices are accordingly developed. The display device processes and displays a great deal of information. A cathode ray tube (CRT) has served as a mainstream of the display device field. However, to meet the needs of the times, a flat panel display device having small size, light weight, and low power consumption is a subject of research.

A thin film transistor (TFT) liquid crystal display (LCD) device is an example of a flat panel display device. The TFT LCD device is very thin and provides superior color display properties. For operation, a thin film transistor serves as a switching element of the TFT LCD device. The thin film transistor of the TFT LCD device switches a pixel such that the pixel controls a transmittance of light which is incident from a back light of the TFT LCD device. An amorphous silicon layer is widely used for a silicon (active) layer of the TFT, because it can be formed on a large, but relatively cheap, glass substrate at a relatively low temperature. The above-mentioned amorphous silicon TFT (a-Si:TFT) is frequently used for thin film transistors.

In general, the LCD devices are divided into transmissive LCD devices and reflective LCD devices according to whether the display uses an included or an external light source.

A typical transmissive LCD device includes a liquid crystal panel and a back light. The liquid crystal panel includes upper and lower substrates with a liquid crystal layer interposed in between. The upper substrate includes a color filter, and the lower substrate includes thin film transistors (TFT) as switching elements. An upper polarizer is arranged on the liquid crystal panel, and a lower polarizer is arranged between the liquid crystal panel and the back light. However, since the transmissive LCD transmits at most about 7% of the incident rays of light from the back light, it is very inefficient in terms of its power consumption.

For this reason, the transmissive LCD device requires a high back light brightness, and thus electric power consumed by the back light increases. A relatively heavy battery is needed to supply sufficient power to the back light of such a device. However, the battery rapidly discharges.

Unlike a transmissive LCD device, a reflective LCD device uses an ambient rays of light incident from a natural light source or an external artificial light source. Because of its low power consumption, the reflective LCD device is widely used for an electric organizer, a personal digital assistant (PDA), or the like that needs a portable display device.

For the above-mentioned reflective LCD device, an opaque material having a reflective property is selected for a pixel electrode such that the reflective pixel electrode can reflect ambient light. As mentioned previously, in the case of the transmissive LCD device, a transparent conductive material is selected for the pixel electrode such that the incident rays from a back light can pass there-through.

The reflective LCD device, however, is useless when the weather or exterior light source is dark. Accordingly, a transflective LCD device has been developed to compensate for the reflective LCD device and the transmissive LCD device. The transflective LCD device can selectively provide the reflective or transmissive mode, depending on needs of users.

FIG. 1 is a partial cross-sectional view illustrating a transflective LCD device 50 according to a related art. For the sake of convenience, just one pixel portion of the transflective LCD device 50 is shown. The transflective LCD device 50 includes an upper plate 10 (color filter substrate), a lower plate 30 (TFT array substrate), an interposed liquid crystal layer 20 therebetween, and a back light 45 disposed below the lower plate 30.

Each of the upper and lower plates 10 and 30 includes a transparent substrate 1. For the upper plate 10, a color filter 12 is formed on the lower surface of the transparent substrate 1, and an upper transparent electrode 14 is formed on the color filter 12. The upper transparent electrode 14 serves as a common electrode. In addition, a half wave plate (HWP) 18 is formed as a retardation film on the upper surface of the transparent substrate 1, and an upper polarizer 16 is formed on the HWP 18. The HWP provides a phase difference of "λ/2" such that right-circularly polarized rays incident thereon are changed to left-circularly polarized when they pass therethrough. The upper polarizer 16 serves as a filter selectively transmitting some rays of incident light. That is to say, the upper polarizer 16 has an optical polarizing axis in one direction, and only the rays having the same orientation as the direction of the optical polarizing axis can pass through the upper polarizer 16.

The HWP 18 serves to improve a viewing angle quality by compensating for phase differences occurring due to users' various viewing angles. Alternatively, a couple of quarter wave plates, which may be respectively formed for the lower and upper plate 10 and 30, can provide the same optical effect as the HWP 18 provides. However, if the HWP 18 is used, only a single HWP 18 is employed. Therefore, the HWP 18 has advantages in cost and processing time.

Still referring to FIG. 1, an insulating layer 33 is formed on the upper surface of the transparent substrate 1 of the lower plate 30, and a lower transparent electrode 32 is formed on the insulating layer 33. A passivation layer 34 and a reflective electrode 36 are sequentially formed on the lower transparent electrode 32, and a transmitting hole 31 is formed passing through the passivation layer 34 and the reflective electrode 36. In addition, a lower polarizer 40 is formed on the lower surface of the transparent substrate 1 of the lower plate 30.

When an electric field is applied across the liquid crystal layer 20, molecules of the liquid crystal layer 20 align according to the electric field. Then, the liquid crystal layer 20 refracts rays of light passing there-through such that a desired image is displayed.

The above-explained transflective LCD device has a transmissive portion "t" that corresponds to a portion of the lower transparent electrode 32 exposed via the transmitting hole 31, and a reflective portion "r" that corresponds to the reflective electrode 36. The transmissive portion "t" has a first cell gap "d1" between the common electrode 14 and the reflective electrode 36. Whereas, the reflective portion "r" has a second cell gap "d2" between the common electrode 14 and the lower transparent electrode 32. The first cell gap "d1" is designed to be larger than the second cell gap "d2" such that incident rays of light have the same efficiency for the transmissive and reflective modes. Specifically, the first cell gap "d1" is preferably about two times as large as the second cell gap "d2."

The liquid crystal layer 20 provides a phase difference to light, and the phase difference of the liquid crystal layer 20 is usually determined depending on a refractive index and a cell gap thereof. For the above-mentioned LCD device, however, the liquid crystal layer 20 exhibits the same refractive index throughout the reflective and transmissive portions. Therefore, only the cell gap is the main factor to determine any difference between the phase difference of the liquid crystal layer 20 in the reflective or transmissive portion. Specifically, if the first cell gap "g1" is two times as large as the second cell gap "g2", the transmissive portion "t" and the reflective portion "r" involve a first phase difference of "λ" and a second phase difference of "λ/2", respectively.

Now, passages and phase changes of the rays of incident light are explained comparing the transmissive and reflective modes. At this point, the upper polarizer 16 and the lower polarizer 40 are assumed to have polarizing axes crossing perpendicular to each other.

In case of the reflective mode, an ambient ray "L1" from an external light source is incident on the upper polarizer 16, and just a first linearly polarized ray passes there-through. The first linearly polarized ray is oriented in the same direction as the direction of the polarizing axis of the upper polarizer. The first linearly polarized ray subsequently passes through the HWP 18, and changes to a second linearly polarized ray perpendicular to the first linearly polarized ray, due to the phase difference "λ/2" of the HWP 18. The second linearly polarized ray subsequently passes through a first portion of the liquid crystal layer 20 having the second cell gap "d2", and changes to the first linearly polarized ray due to the phase difference "λ/2" of the first liquid crystal portion. Then, the reflective electrode 36 reflects the first linearly polarized ray such that the first linearly polarized ray passes through the liquid crystal layer 20 again and changes to the second linearly polarized ray again. The second linearly polarized ray subsequently passes through the HWP 18 again, and changes to the first linearly polarized ray. Since the first linearly polarized ray corresponds to the polarizing axis of the upper polarizer 16, it can pass through the upper polarizer 16 in a normally white state.

In case of the transmissive mode, an incident ray "L2" from the back light 45 is incident on the lower polarizer 40, and just the second linearly polarized ray that corresponds to the polarizing axis of the lower polarizer 40 passes there-through. The second linearly polarized ray subsequently passes through a second portion of the liquid crystal 20 having the first cell gap "d1" but still remains as the second linearly polarized ray due to the phase difference "λ" of the second liquid crystal portion. Then, the second linearly polarized ray changes to the first linearly polarized ray after passing through the HWP 18, and passes through the upper polarizer 16 in the normally white state, like the reflective mode.

As explained above, because the first and second cell gaps "d1" and "d2" have different values, the transmissive mode and the reflective mode provide the same efficiency for rays of light.

In another aspect, color purity should be considered in designing the transflective LCD device. In the transflective LCD device of FIG. 1, the reflective mode implements a better color purity than the transmissive mode. In the transmissive mode, the incident ray "L2" passes through the color filter 12 only once. In the reflective mode, however, the ambient ray "L1" passes through the color filter 12 twice. That is to say, the ray is only once colored by the color filter 12 in the transmissive mode, but the ray is twice colored by the color filter 12 in the reflective mode. Therefore, there exists a difference of color purity between the reflective mode and the transmissive mode.

To avoid the above-mentioned problem, a dual color filter having a varying thickness is conventionally adopted for the transflective LCD device. FIG. 2 shows a transflective LCD device 60 having the dual color filter 62 according to the Korea Patent No. 2000-9979.

As shown, the dual color filter layer 62 has first and second portions 62a and 62b having different thicknesses. The first portion 62a having the smaller thickness corresponds to the reflective portion "r", whereas the second portion 62b having the larger thickness corresponds to the transmissive portion 62b. A transparent buffer layer 64 is interposed between the color filter layer 62 and the transparent substrate 1 such that a desired thickness ratio is achieved between the first and second portions 62a and 62b. The second portion 62b is preferably two times as thick as the first portion 62a such that the transmissive portion "t" involves the same color purity as the reflective portion "r".

FIG. 3 is an expanded cross-sectional view illustrating the dual color filter 62 of FIG. 2. As shown, the dual color filter 62 is interposed between the transparent substrate 1 and the common electrode 14. For the sake of convenience in explanation, the dual color filter 62 is captioned in FIG. 3. The dual color filter 62 has a plurality of sub-filters "R", "G", and "B", a black matrix 61 disposed between the sub-filters, and the buffer layer 64 interposed between the sub-filters and the black matrix 61. Each of the sub-filters "R", "G", and "B" is divided into the first portion 62a and the second portion 62b, which correspond to the reflective portion "r" and the transmissive portion "t", respectively. As mentioned previously, the transparent buffer layer 64 is used for setting the thickness ratio between first and second portions 62a and 62b such that the second portion 62b is preferably two times as thick as the first portion 62a.

The above-mentioned dual color filter 62, however, has some problems as follows. The sub-filters "R", "G", and "B" are difficult to form uniformly on the transparent substrate 1 where the buffer layer 64 is already formed. To form the sub-filter "R", "G", or "B", a resin of a viscous liquid state is deposited and baked on the substrate 1 after the buffer layer 64 is formed on the substrate 1. The resin, however, has difficulty filling the concavity between the adjacent buffer layers 64 due to its viscosity. Then, as the resin is baked, the resin shrinks in an area between the adjacent buffer layers 64. Therefore, after the baking, a concave portion "N" (shown as a broken line) is formed on the upper surface of the second portion 62b of the sub-filter.

For example, the first and second portion 62a and 62b may be designed to be 1 m and 2 μm, respectively, in thickness such that the reflective mode and the transmissive mode have the same color purity. The second portion 62b of the sub-filter, however, may have a smaller thickness of 1.5 to 1.6 μm because of the above-mentioned reason. Then, a desired effect of the different thicknesses between the first and second portions 62a and 62b is deteriorated such that a color purity difference still exists between the transmissive and reflective modes.

In addition, if the dual color filter 62 has an irregular surface, the common electrode 14 formed thereon also has an irregular surface corresponding to the dual color filter 62. Then, the liquid crystal layer 20 cannot be uniformly aligned due to the irregular common electrode 14 such that the display quality is deteriorated.

SUMMARY OF THE INVENTION

Accordingly, the present invention is directed to an LCD device that substantially obviates one or more of the problems due to limitations and disadvantages of the related art.

An object of the present invention is to provide a transflective LCD device having a uniform dual color filter such that a high display quality is achieved.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In order to achieve the above object, the preferred embodiment of the present invention provides a transflective liquid crystal display device, which includes: an upper substrate and a lower substrate opposing to each other; a lower transparent electrode formed on the lower substrate; a passivation layer formed on the lower transparent electrode; a reflective electrode formed on the passivation layer, the reflective electrode having an open hole formed passing through the passivation layer such that a portion of the lower transparent electrode is exposed; a liquid crystal layer interposed between the upper and lower substrates, the liquid crystal layer having a first cell gap that corresponds to the lower transparent electrode and a second cell gap that corresponds to the reflective electrode, wherein the first cell gap is larger than the second cell gap; a color filter layer formed on the upper substrate, the color filter layer including a first portion that corresponds to the reflective electrode, a second portion that corresponds to the open hole, and a dummy pattern disposed, wherein the second portion is thicker than the first portion, and the dummy pattern is formed into the second portion; and an upper transparent electrode formed on the color filter layer.

The second portion of the color filter layer is preferably 1.2 to 2.0 times as thick as the first portion thereof.

The reflective electrode is made of an opaque material preferably including aluminum (Al) having a high reflectivity. The passivation layer is preferably made of benzocyclobutene (BCB).

The dummy pattern preferably has the same thickness as the buffer layer, and takes at most 20% area of the second portion of the color filter layer.

In another aspect, the present invention provides a method of fabricating an upper substrate for a transflective LCD device, the method includes: forming a black matrix on a substrate; depositing and patterning a transparent insulating material on the substrate having the black matrix such that a buffer layer and a dummy pattern are formed, wherein the buffer layer covers the black matrix, and the dummy pattern is disposed between the adjacent buffer layers; repeatedly depositing and patterning a plurality of color resins on the substrate where the buffer layer and the dummy pattern are formed such that red, green, and blue color filters are formed; and forming an upper transparent electrode on substrate where the color filters are formed.

Each color filter has a first portion covering the buffer layer and a second portion covering the dummy pattern, and the second portion is preferably 1.2 to 2.0 times as thick as the first portion.

The dummy pattern preferably has the same thickness as the buffer layer and takes at most 20% area of the second portion of the color filter layer.

The black matrix is preferably a single layer made of chromium (Cr).

Alternatively, the black matrix is a double layer made of chromium (Cr) and chromium oxide ($CrO_x$).

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 4:
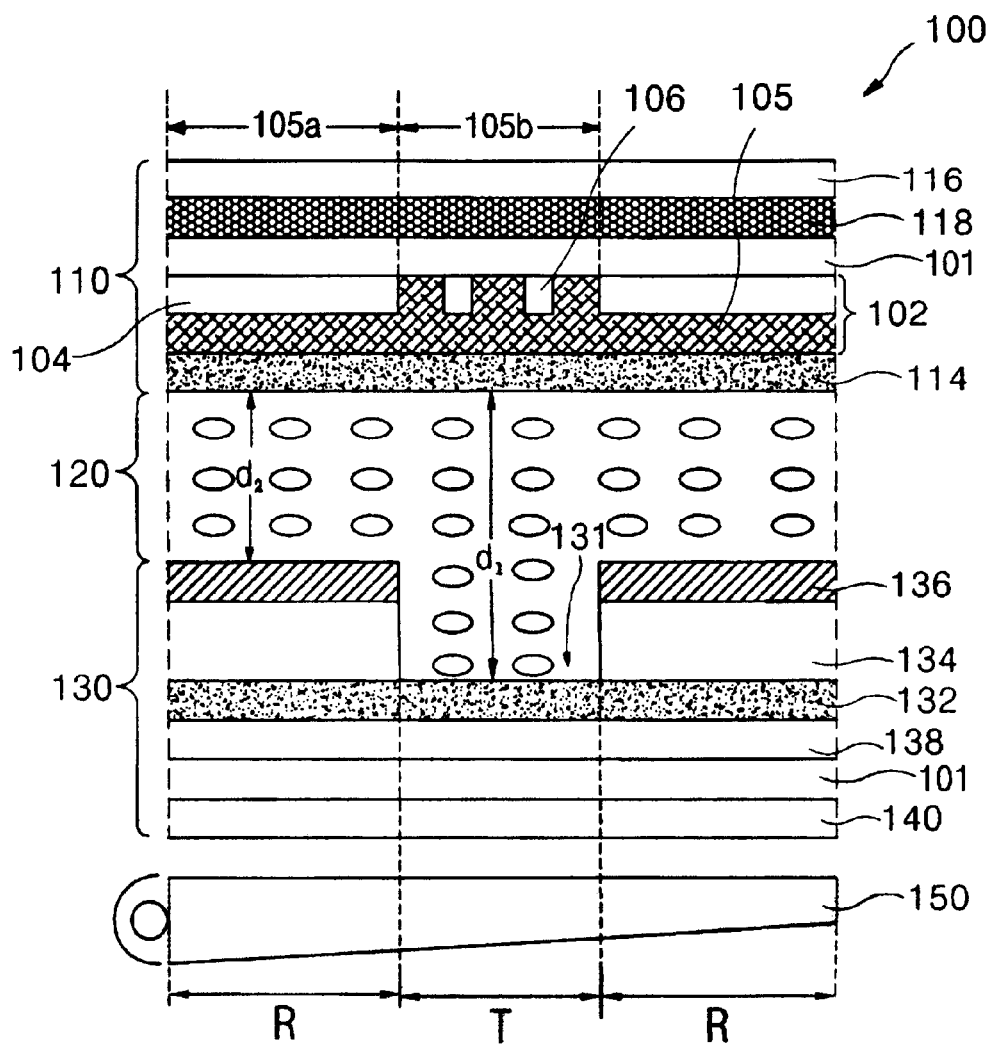
FIG. 4 is a cross-sectional view illustrating a transflective LCD device according to a preferred embodiment of the present invention.

In FIG. 4, a transflective LCD device 100 according to a preferred embodiment includes an upper plate 110 (color filter substrate), a lower plate 130 (TFT array substrate), an interposed liquid crystal layer 120 therebetween, and a back light 150 disposed below the lower plate 130.

Each of the upper and lower plates 110 and 130 includes a transparent substrate 101. For the upper plate 110, a color filter layer 102 is formed on the lower surface of the transparent substrate 101, and an upper transparent electrode 114 is formed on the color filter layer 102. The upper transparent electrode 114 serves as a common electrode. In addition, a half wave plate (HWPT) 118 is formed as a retardation film on the upper surface of the transparent substrate 101, and an upper polarizer 116 is formed on the HWP 118.

An insulating layer 138 is formed on the upper surface of the transparent substrate 101 of the lower plate 130, and a lower transparent electrode 132 is formed on the insulating layer 138. A passivation layer 134 and a reflective electrode 136 are sequentially formed on the lower transparent electrode 132, and a transmitting hole 131 is formed passing through the passivation layer 134 and the reflective electrode 136. The lower transparent electrode 132 is preferably made of a transparent conductive material preferably selected from a group consisting of indium tin oxide (ITO) and indium zinc oxide (IZO). The reflective electrode 136 is made of an opaque metal preferably including aluminum (Al), having a high reflectivity. In addition, a lower polarizer 140 is formed on the lower surface of the transparent substrate 101 of the lower plate 130.

The above-explained transflective LCD device has a transmissive portion "T" that corresponds to a portion of the lower transparent electrode 132 exposed via the transmitting hole 131, and a reflective portion "R" that corresponds to the reflective electrode 136. The transmissive portion "T" has a first cell gap "d1" between the upper transparent electrode 114 and the reflective electrode 136, whereas, the reflective portion "R" has a second cell gap "d2" between the common electrode 114 and the lower transparent electrode 132. In other words, the liquid crystal layer 120 has the first cell gap "d1" and the second cell gap "d2", which correspond to the reflective portion "R" and the transmissive portion "T", respectively.

At this point, the first cell gap "d1" is preferably about two times as large as the second cell gap "d2 such that incident rays of light have the same efficiency for the transmissive and reflective modes. The difference between the first and second cell gaps "d1" and "d2" is achieved by forming the open hole 131 passing through passivation layer 134 as well as the reflective electrode 136. The passivation layer 134 is preferably made of benzocyclobutene (BCB), which is an organic insulating material having a good step coverage.

The color filter layer 102 includes a dual color filter 105 and a buffer layer 104. The dual color filter 105 has a first portion 105a that corresponds to the reflective electrode 136, and a second portion 105b that corresponds to the open hole 131. The second portion 105b is preferably two times as thick as the first portion 105a. At this point, the buffer layer 104 serves to fill the gaps between the first portion 105a of the dual color filter 105 and the transparent substrate 101 of the upper substrate 110.

For the dual color filter 105 according to the preferred embodiment, a dummy pattern 106 is further formed into the second portion 105b of the dual color filter 105. The dummy pattern 106 serves to level the second portion 105b such that a uniform surface and a uniform thickness thereof can be achieved. The dummy pattern is preferably made of the same material as the buffer layer 104, which is made of a transparent insulating material.

Referring now to FIGS. 5A to 5E, a method of fabricating the above-mentioned color filter layer 102 is explained.

Figure 5A:
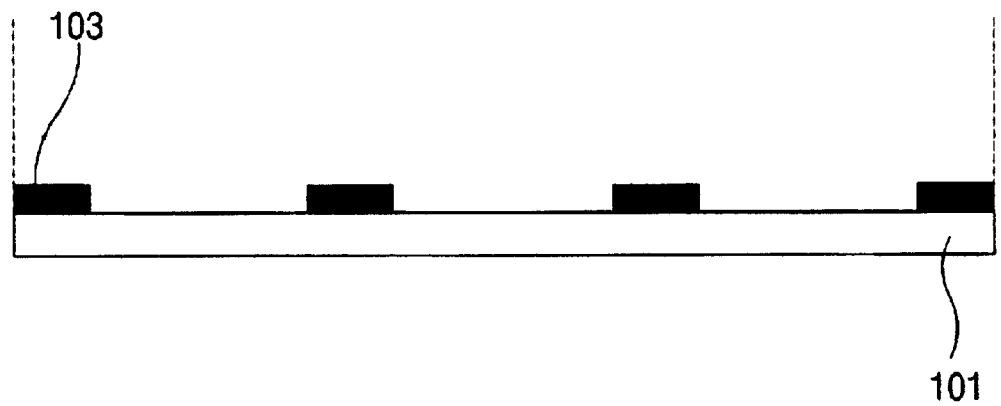
FIGS. 5A to 5E are cross-sectional views illustrating a sequence for fabricating a dual color filter according to the preferred embodiment.

In FIG. 5A, a black matrix 103 is formed on the transparent substrate 101. The black matrix 103 is preferably a single layer made of chromium (Cr) or a double-layer including a chromium (Cr) and chromium oxide ($CrO_x$). The black matrix 103 serves to protect a thin film transistor (not shown) from incident rays of light and serves to adjust intervals between the adjacent dual color filters (reference 105 of FIG. 4). In addition, the black matrix 103 serves to prevent leakage of incident light through intervals between electrical lines formed on the lower plate (reference 130 of FIG. 4). For fabricating the black matrix 103, at first, a light-shielding material is deposited on the substrate 101. Then, an opaque metal having a low reflectivity is deposited on the light-shielding material preferably using sputtering, and a photoresist is formed on the opaque metal. A positive photoresist is preferably used for the above-mentioned exposing. After the photoresist is exposed and developed, the opaque metal is patterned such that the black matrix 103 is formed.

Figure 5B:
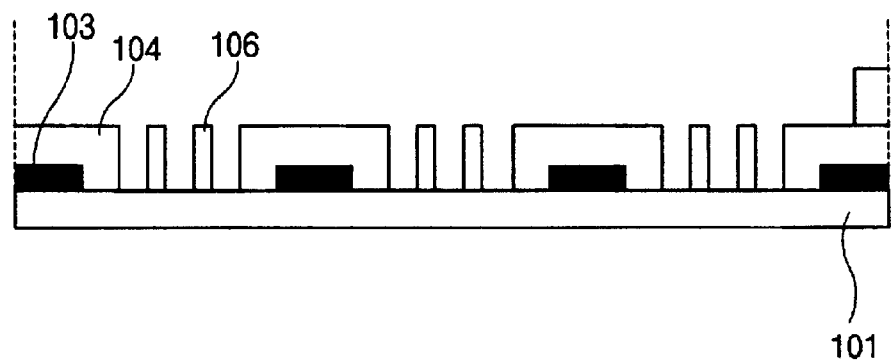

In FIG. 5B, the buffer layer 104 and the dummy pattern 106 are formed on the substrate 101 where the black matrix 103 is formed. The buffer layer 104 covers the black matrix 103, and a gap or interval is present between the adjacent buffer layers 104. The above-mentioned gap preferably corresponds to the open hole (reference 131 of FIG. 4) formed passing through the reflective electrode (reference 136 of FIG. 4). In the gap between the adjacent buffer layers 104, at least one dummy pattern 106 is disposed. For fabricating the buffer layer 104 and the dummy pattern 106, a transparent insulating material is deposited and patterned on the substrate 101. The buffer layer 104 and the dummy pattern 106 preferably have the same thickness, and, at this point, the transparent insulating material is preferably selected from a group consisting of silicon nitride ($SiN_x$) and BCB.

Figure 5C:
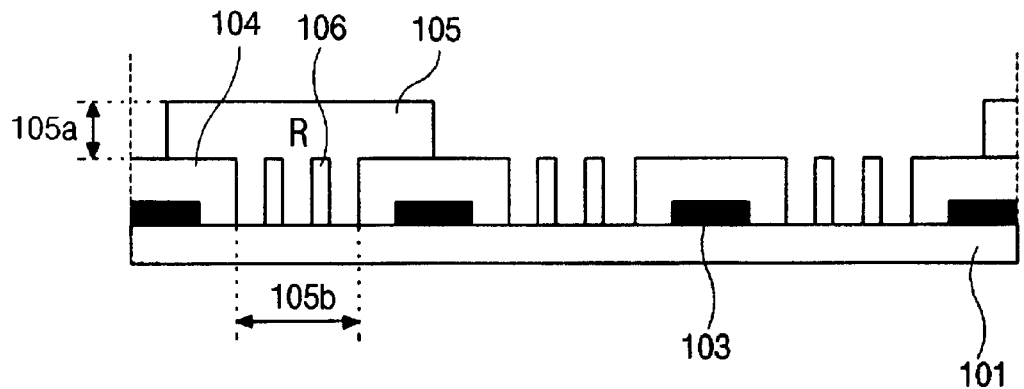
Figure 5D:
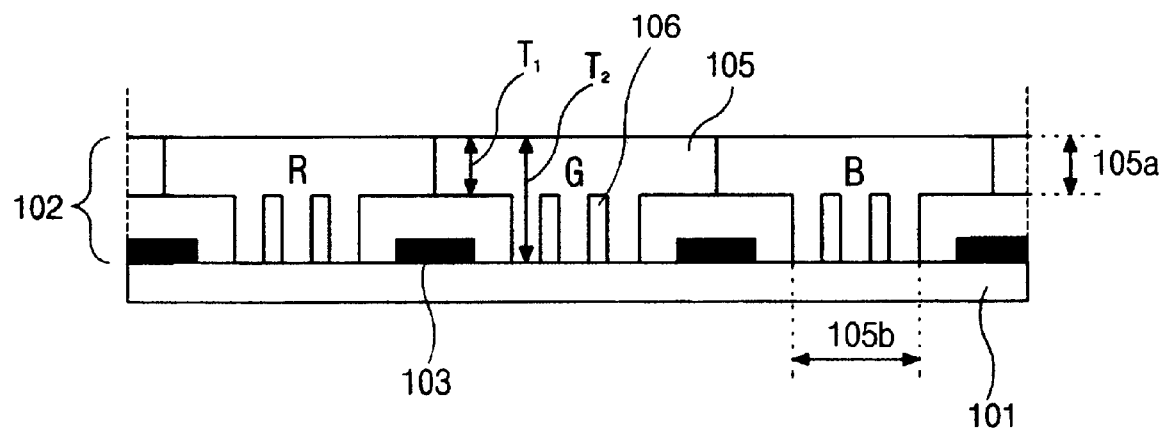

The buffer layer 104 serves to provide a continually stepped shape on the substrate 1. Accordingly, as shown in FIGS. 5C and 5D, when the dual color filter 105 is formed on the substrate 1, the first and second portions 105a and 105b thereof have different thicknesses.

Figure 1:
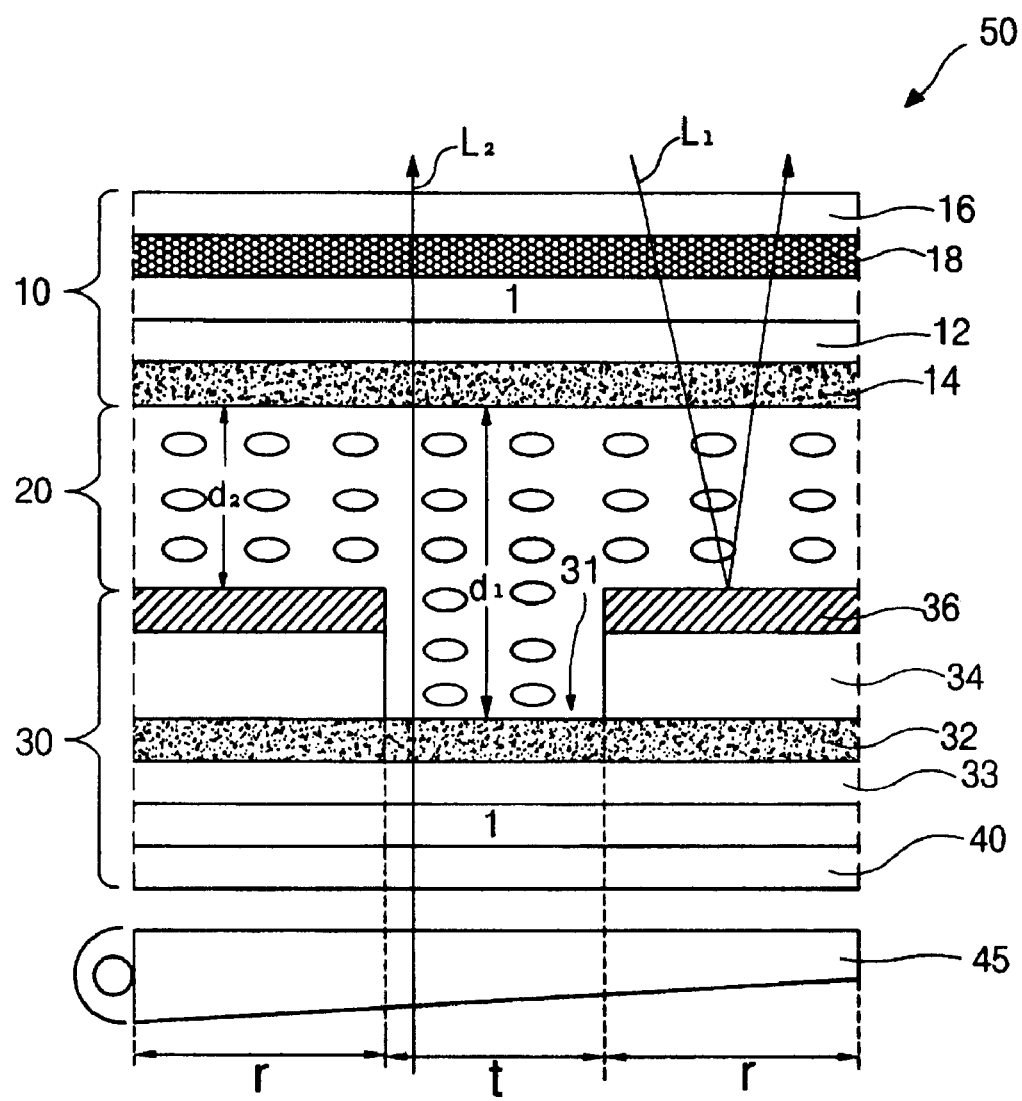
FIG. 1 is a cross-sectional view illustrating a transflective LCD device according to a related art.
Figure 2:
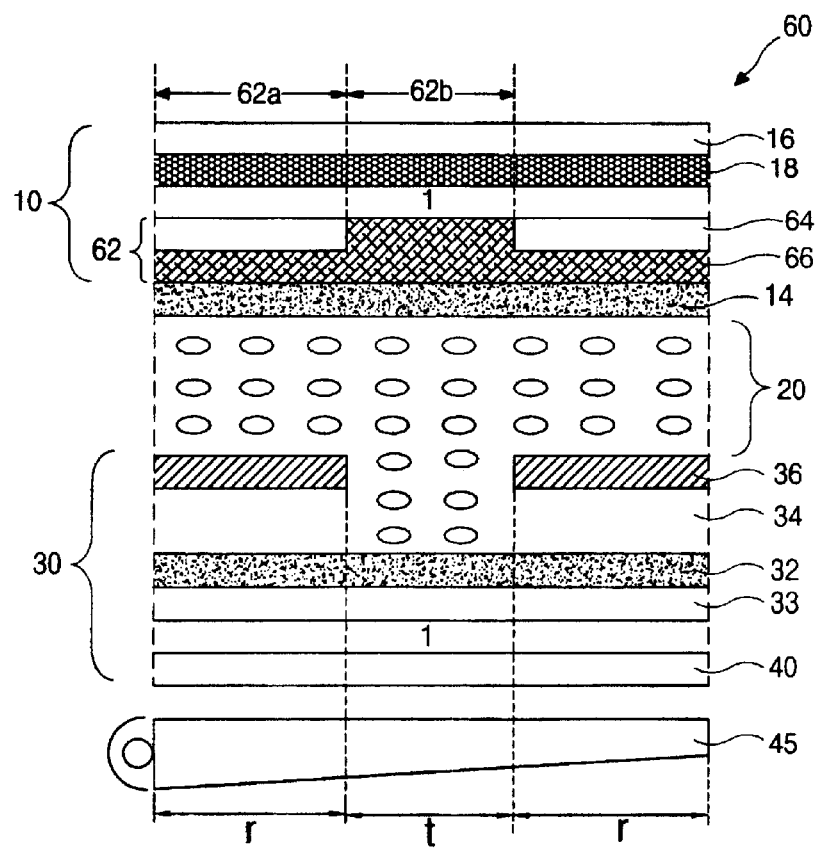
FIG. 2 is a cross-sectional view illustrating a transflective LCD device adopting a dual color filter according to the Korea Patent No. 2000-9979.
Figure 3:
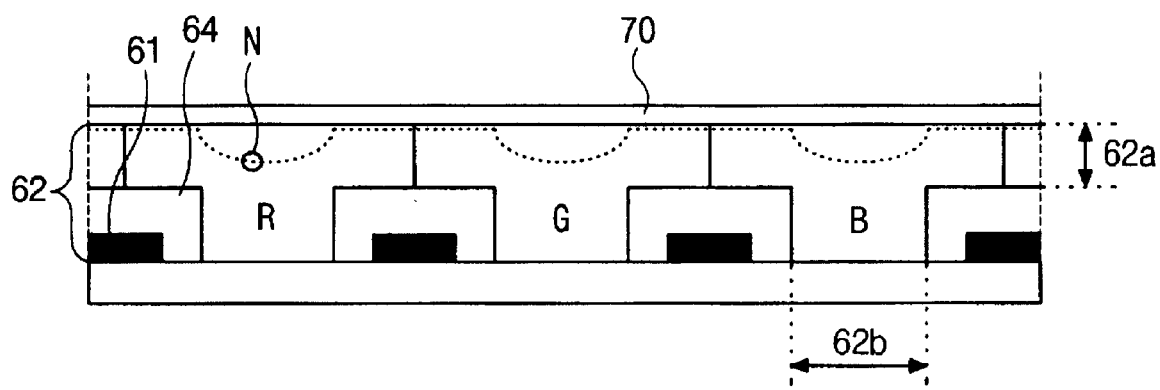
FIG. 3 is an expanded cross-sectional view illustrating the dual color filter of FIG. 2.

The dummy pattern 106 serves to transform the larger gap between the adjacent buffer layers 104 into a plurality of smaller gaps. The dual color filter 105 is formed by depositing a viscous resin on the substrate 101 having the stepped surface due to the buffer layers 104. If the interval between the adjacent buffer layers 104 is very large, the second portion 105b of the dual color filter 105 may have an irregular surface and thickness as shown in FIG. 3. In the preferred embodiment, however, because of the dummy pattern 106, the plurality of smaller gaps are present between the adjacent buffer layers 104. Therefore, the above-mentioned problem of the conventional dual color filter is avoided.

The above-explained dummy pattern 106 preferably occupies at most 20% of the area of the second portion 105b. If the dummy pattern 106 occupies too much of the second portion 105b, a color property of the transmissive mode is deteriorated.

For fabricating the dual color filter 105 having a red color, a viscous resin admixed with a red dye is deposited on the substrate 101 where the buffer layer 104 and the dummy pattern 106 are formed. Then, the resin is exposed using a color-resist and developed such that a red dual color filter "R" is formed. At this time, a negative color-resist is preferably used for the above-mentioned exposing. If a photosensitive resin is selected for the viscous resin, no color-resist is needed for the above-mentioned exposing. After the red dual color filter "R" is formed, a green dual color filter "G" and a blue dual color filter "B" are sequentially formed by repeating the above-explained process.

As shown in FIG. 5D, the first portion 105a and the second portion 105b of the dual color filter 105 have a first thickness "$T_1$" and a second thickness "$T_2$", respectively. At this point, the second thickness "$T_2$" is preferably 1.2 to 2.0 times as large as the first thickness "$T_1$". Because of the dummy pattern 106, the above-mentioned thickness ratio "$T_2/T_1$" does not change though after the viscous resin is hardened.

Figure 5E:
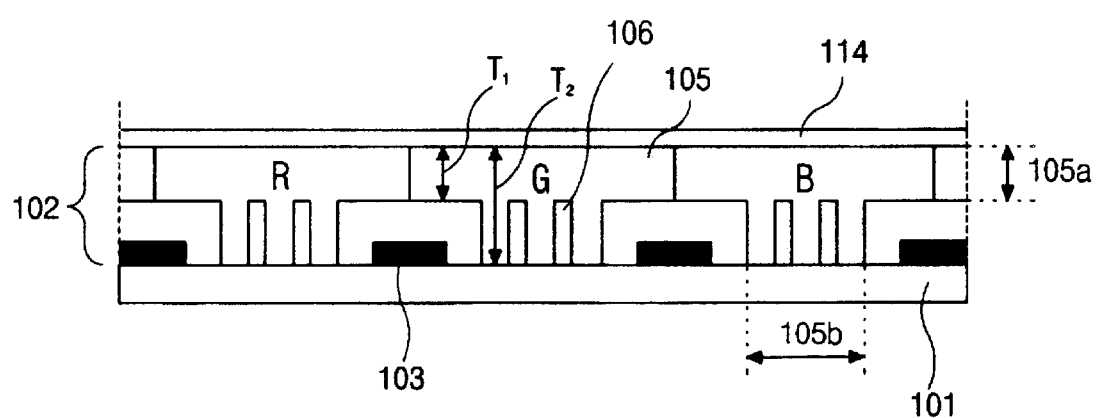

In FIG. 5E, a transparent conductive material is deposited on the color filter layer 102 such that the upper transparent electrode 114 is formed. At this point, the upper transparent electrode 114 is preferably formed without an etching step. Because the color filter layer 102 has a uniform surface, the upper transparent electrode 114 is also uniformly formed.

As explained above, the preferred embodiment of the present invention adopts the dummy pattern 106 formed into the second portion 105b of the dual color filter 105. Because of the dummy pattern 106, the second portion 105b of the dual color filter 105 is formed with a uniform surface and thickness. Accordingly, the thickness ratio of the first and second portions 105a and 105b of the dual color filter 105 can be accurately adjusted to have a desired value.

It will be apparent to those skilled in the art that various modifications and variation can be made in the method of manufacturing a thin film transistor of the present invention without departing from the spirit or scope of the invention. Thus, it is intended that the present invention cover the modifications and variations of this invention provided they come within the scope of the appended claims and their equivalents.

What is claimed is:

1. A transflective liquid crystal display device comprising:

an upper substrate and a lower substrate opposing each other;

a lower transparent electrode formed on the lower substrate;

a passivation layer formed on the lower transparent electrode;

a reflective electrode formed on the passivation layer, the reflective electrode having an open hole formed passing through the passivation layer such that a portion of the lower transparent electrode is exposed;

a liquid crystal layer interposed between the upper and lower substrates, the liquid crystal layer having a first cell gap that corresponds to the lower transparent electrode and a second cell gap that corresponds to the reflective electrode, wherein the first cell gap is larger than the second cell gap;

a color filter layer formed on the upper substrate, the color filter layer including a first portion that corresponds to the reflective electrode, a second portion that corresponds to the open hole, and a dummy pattern, wherein the second portion is thicker than the first portion, and the dummy pattern is formed in the second portion; and an upper transparent electrode formed on the color filter layer.

2. The device of claim 1, wherein the second portion of the color filter layer is 1.2 to 2.0 times as thick as the first portion thereof.

3. The device of claim 1, wherein the reflective electrode is made of an opaque material including aluminum (Al) having a high reflectivity.

4. The device of claim 1, wherein the passivation layer is made of benzocyclobutene (BCB).

5. The device of claim 1, wherein the color filter layer further comprises a buffer layer, and wherein the dummy pattern has a same thickness as the buffer layer and occupies no more than about 20% of the second portion of the color filter layer.

6. A method of fabricating a color filter substrate for a transflective LCD device, the method comprising:

forming a black matrix on a substrate;

depositing and patterning a transparent insulating material on the substrate having the black matrix such that a buffer layer and a dummy pattern are formed, wherein the buffer layer covers the black matrix, and the dummy pattern is disposed between adjacent buffer layers;

repeatedly depositing and patterning a plurality of color resins on the substrate where the buffer layer and the dummy pattern are formed such that red, green, and blue color filters are formed; and forming an upper transparent electrode on the substrate where the color filters are formed.

7. The method of claim 6, wherein each color filter has a first portion covering the buffer layer and a second portion covering the dummy pattern, and the second portion is 1.2 to 2.0 times as thick as the first portion.

8. The device of claim 6, wherein the dummy pattern has a same thickness as the buffer layer and occupies no more than about 20% of the second portion of the color filter layer.

9. The device of claim 6, wherein the black matrix is a single layer made of chromium (Cr).

10. The device of claim 6, wherein the black matrix is a double layer made of chromium (Cr) and chromium oxide ($CrO_x$).

* * * * *